Figure 7:
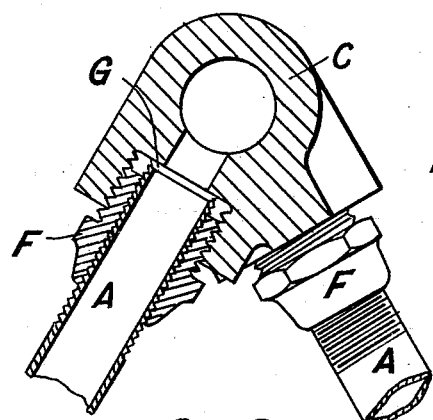

No. 666,127. Patented Jan. 15, 1901.
W. C. BORROWMAN, J. B. EDMISTON & W. C. WALLACE.
SUPERHEATER.
(Application filed Apr. 14, 1900.)
(No Model.) 6 Sheets—Sheet 1.
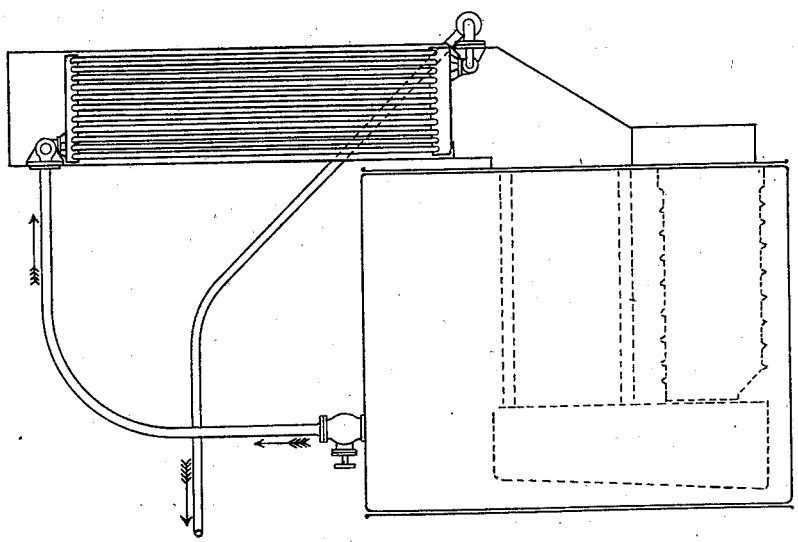
FIG. 2.
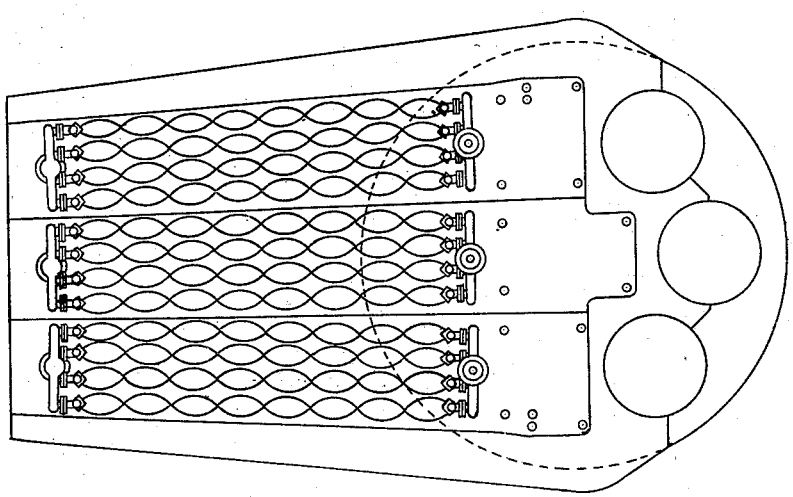
FIG. I.
Witnesses
Edgar M. Kitchin
Geo. P. Kingsbury.
Inventors
William C. Borrowman
James B. Edmiston
William C. Wallace
by their Atty
Mason Fenwick Lawrence

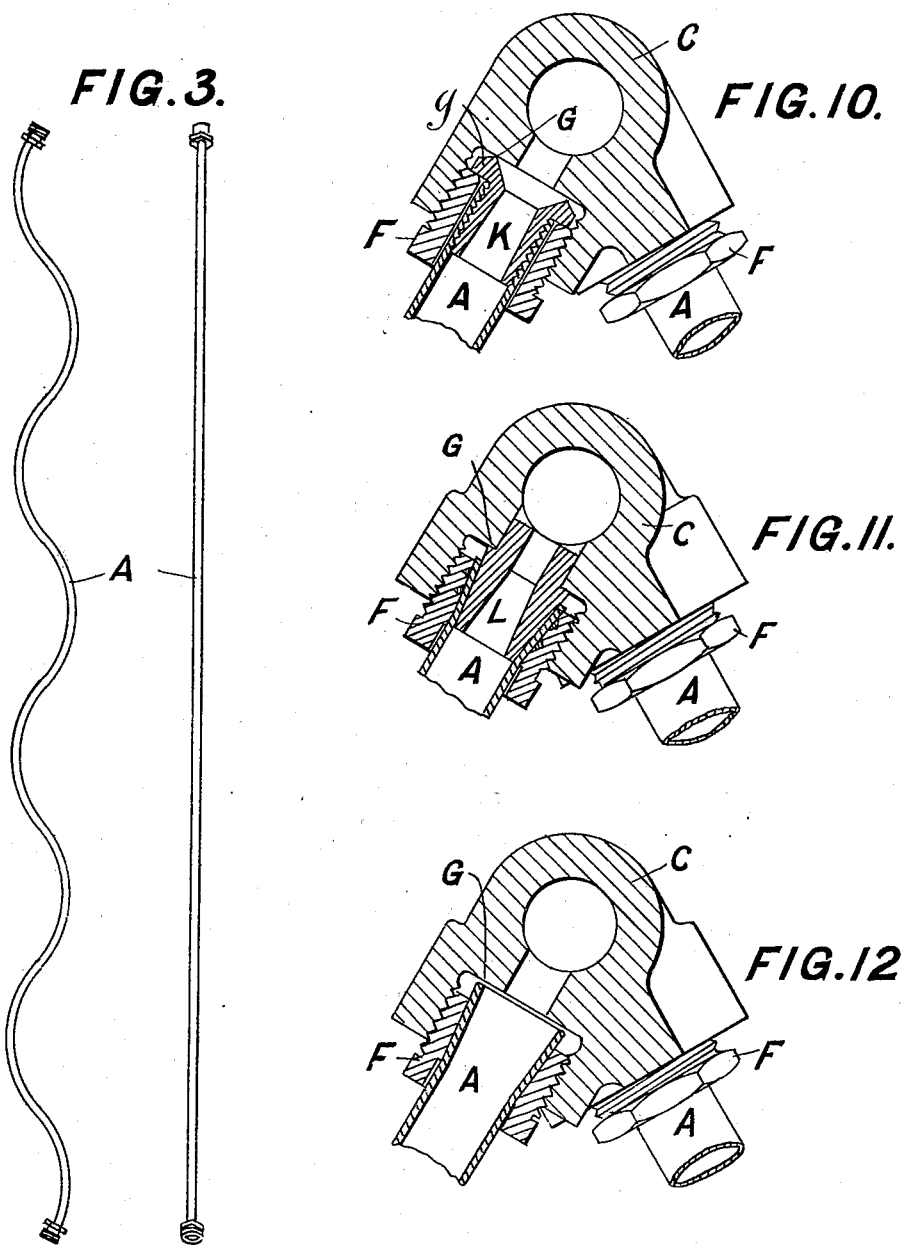

No. 666,127. Patented Jan. 15, 1901.
W. C. BORROWMAN, J. B. EDMISTON & W. C. WALLACE.
SUPERHEATER.
(Application filed Apr. 14, 1900.)
(No Model.) 6 Sheets—Sheet 3.
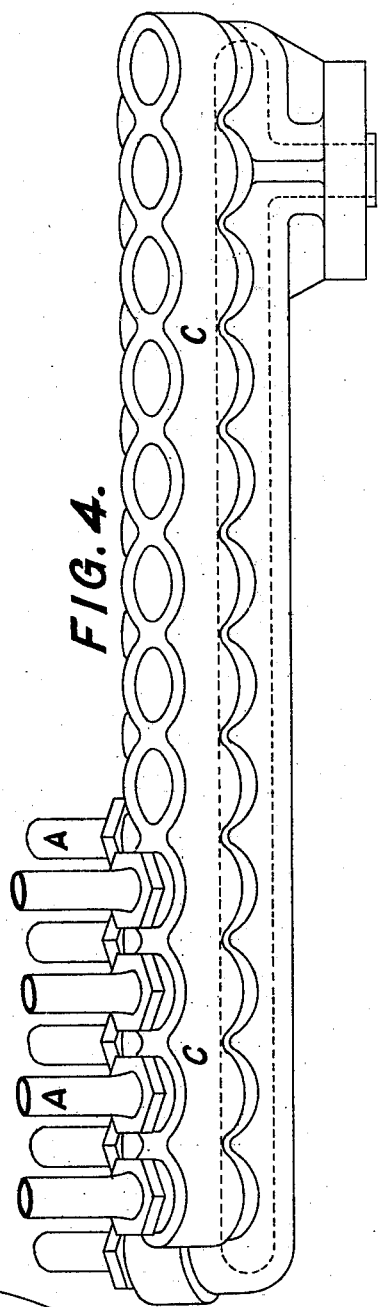
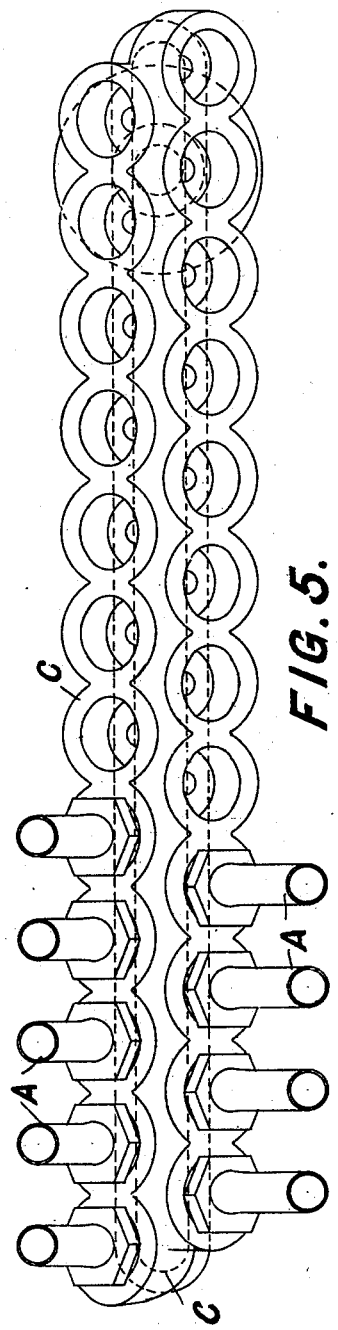
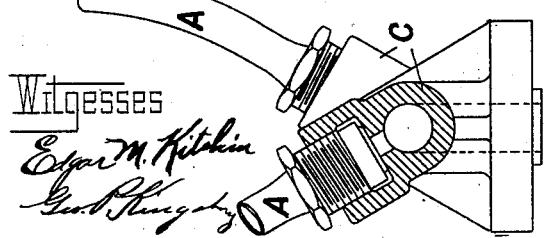

No. 666,127. Patented Jan. 15, 1901.
W. C. BORROWMAN, J. B. EDMISTON & W. C. WALLACE.
SUPERHEATER.
(Application filed Apr. 14, 1900.)
(No Model.) 6 Sheets—Sheet 4.

Witnesses
Edgar M. Kitchin
Geo. P. Kingsbury

Inventors
William C. Borrowman
James B. Edmiston
William C. Wallace
by their Atty
Mason Fenwick Lawrence No. 666,127. Patented Jan. 15, 1901.
W. C. BORROWMAN, J. B. EDMISTON & W. C. WALLACE.
SUPERHEATER.
(Application filed Apr. 14, 1900.)
(No Model.) 6 Sheets—Sheet 5.
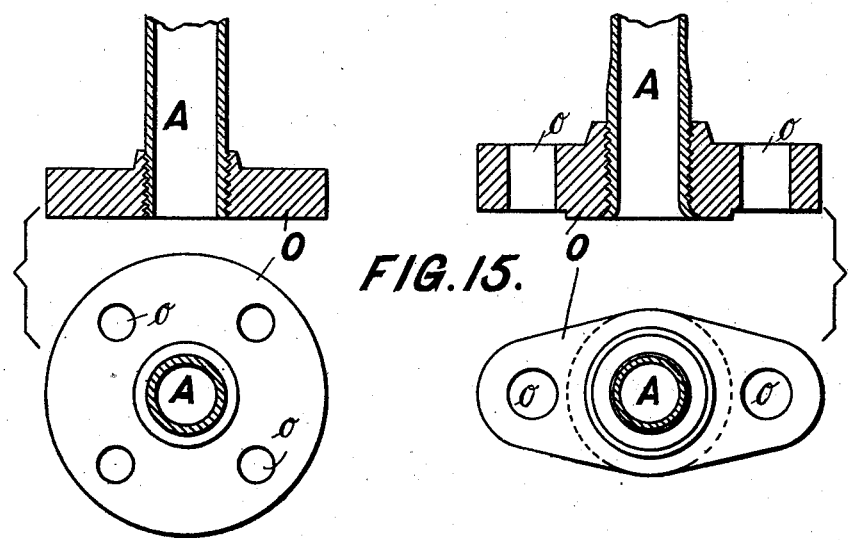
FIG. 15.
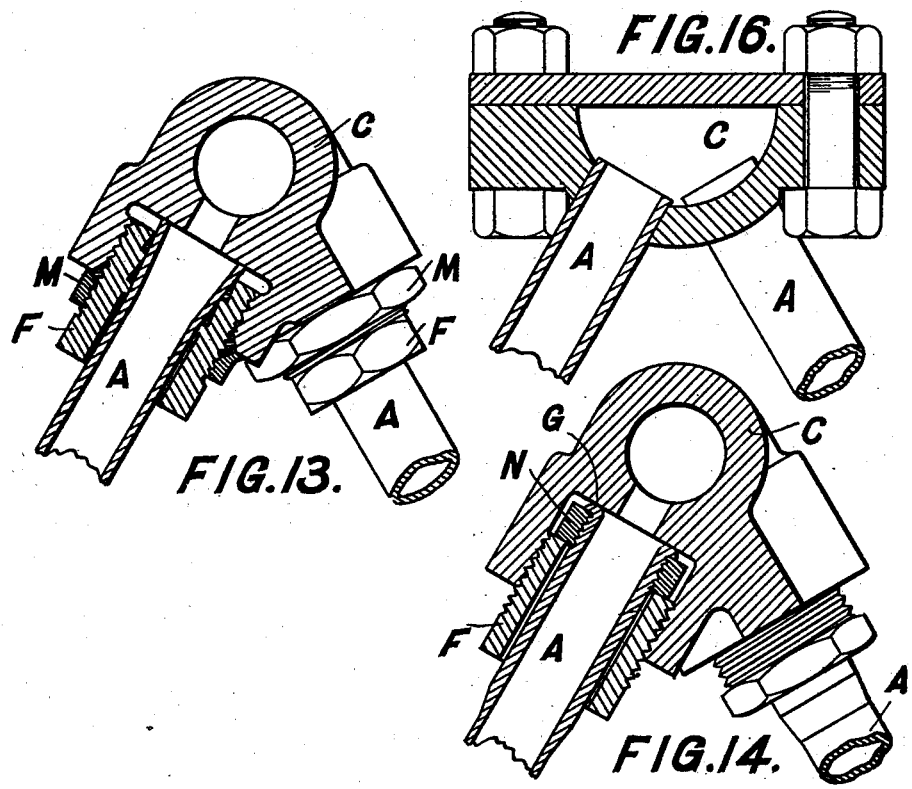
FIG. 16.
FIG. 13.
FIG. 14.

No. 666,127. Patented Jan. 15, 1901.
W. C. BORROWMAN, J. B. EDMISTON & W. C. WALLACE.
SUPERHEATER.
(Application filed Apr. 14, 1900.)
(No Model.) 6 Sheets—Sheet 6.
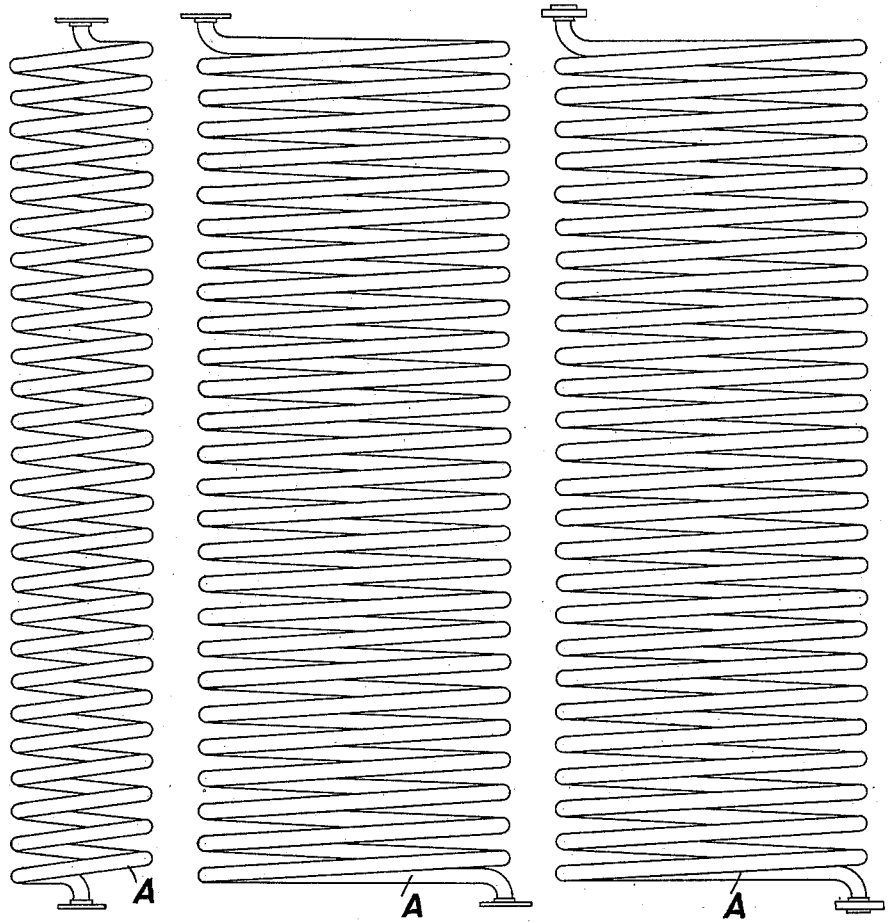
FIG. 17.   FIG. 18.   FIG. 19.
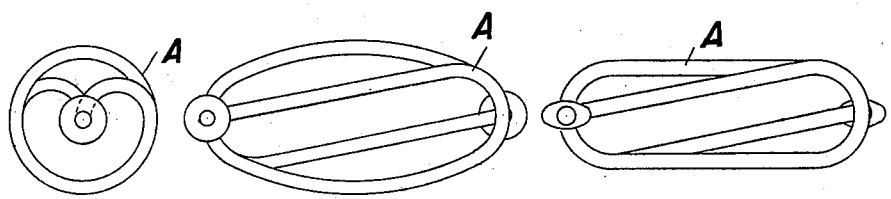

UNITED STATES PATENT OFFICE.

WILLIAM CAMERON BORROWMAN, OF WEST HARTLEPOOL, JAMES B. EDMISTON, OF LIVERPOOL, AND WILLIAM CARLILE WALLACE, OF MARPLE, ENGLAND.

SUPERHEATER.

SPECIFICATION forming part of Letters Patent No. 666,127, dated January 15, 1901.

Application filed April 14, 1900. Serial No. 12,921. (No model.)

*To all whom it may concern:*

Be it known that we, WILLIAM CAMERON BORROWMAN, residing at West Hartlepool, county of Durham, JAMES BROWN EDMISTON, residing at Liverpool, county of Lancaster, and WILLIAM CARLILE WALLACE, residing at Marple, county of Chester, England, and whose full postal address is Newstead, West Hartlepool, England, subjects of the Queen of Great Britain, have invented certain new and useful Improvements in Superheaters or Analogous Structures, (for which application has been made in England for provisional protection, under No. 1,918, dated January 30, 1900,) of which the following is a specification.

This invention has for its object an apparatus applicable for superheating steam for preventing priming in engines, for heating feed-water for steam-boilers, and for other like purposes, which will now be described.

The invention will be understood from the following description, reference being had to the accompanying drawings, in which—

Figure 1 is a sectional front elevation showing our invention applied to a steam-superheater; Fig. 2, a sectional side elevation thereof; Fig. 3, front and side views of one of the pipes; Fig. 4, a side elevation of one of the transverse boxes or chambers in which each row of pipes is socketed; Fig. 5, a plan; Fig. 6, a cross-section; Figs. 7, 8, 9, 10, 11, 12, 13, 14, 15, and 16, detail views of several ways in which the socketing may be effected. Figs. 17, 18, and 19 show three modifications in the arrangement of the pipes.

As applied to steam-superheaters we preferably provide an apparatus comprising rows of pipes A, carrying the steam which is required to be superheated and which are placed in a chamber or flue B, through which the hot gases of the furnace pass and which may be placed in any position with respect to the boiler or flue, so as to superheat the steam contained in the pipes. These pipes are made in such a manner as to provide a large heating-surface and at the same time have special facilities for expansion and contraction. For this purpose the pipes A are made of serpentine or wavy outline, as shown in Fig. 3, and they are arranged so that the curves or waves of each pipe shall be crosswise to the waves or serpentine curves of each adjacent pipe in such a manner as to form a kind of network of pipes. The ends of each row of pipes are socketed into the hollow transverse boxes or chambers C, which connect, respectively, with the steam-supply D and delivery E. The socketing of the pipe ends into the boxes takes place alternately on opposite sides, as shown in Figs. 1, 4, 5, and 6, and this renders it possible to socket a larger number of pipes in one box than would be the case if the pipes were socketed all on one side. The plan view, Fig. 5, shows the sockets on opposite sides of each box alternating with each other. The pipes A are by preference made as thin as possible. Pipes made and arranged in this form not only give more heating-surface, but provide admirable facilities for expansion and contraction, besides enabling the hot gases to impinge against their surfaces during their passage through the flue. Furthermore, with the serpentine arrangement of pipes the ends are so socketed into the boxes as to secure a steam and water tight joint, but allow for no expansive movement, this latter being allowed for purely by the wavy or serpentine form of the pipes.

The preferred socketing arrangements are as follows:

Fig. 7: The ends of the pipes A seat themselves on seatings G at the bottom of socket in transverse boxes C. The ends of the pipes are screwed on the outside and fitted with nuts or screw-glands F, which themselves screw into sockets in C. The threads, however, on the outside of the glands F where they screw into the sockets are of different pitch to the threads on the pipes A, which screw into the glands F. The consequence is that being of different pitch the screwing in of the nut F into the socket will lock the pipes A and bind them in position with the extremities of the pipes held firmly on their seats G.

Figure 8:
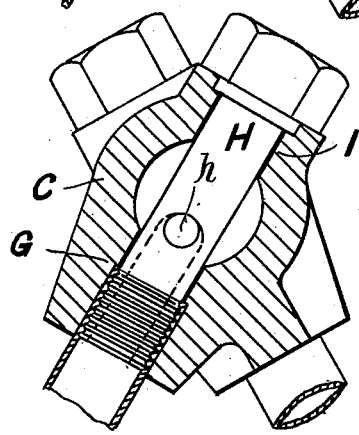

Fig. 8: The ends of the pipes A, which are sprung into the sockets in the transverse boxes C, are screwed inside and pins H inserted through holes I at the rear of the boxes C at the opposite side to that at which the pipes A are inserted or sprung in. These pins H are screwed into the ends of the pipes A, so as to hold them firmly in position with a certain amount of tension and firmly bind the ends against their seatings G. The pins H are made hollow a part of their length, as shown, with a transverse hole $h$, so as to permit of the passage of steam from the pipes A into the inside passage of the transverse boxes or chambers C.

Figure 9:
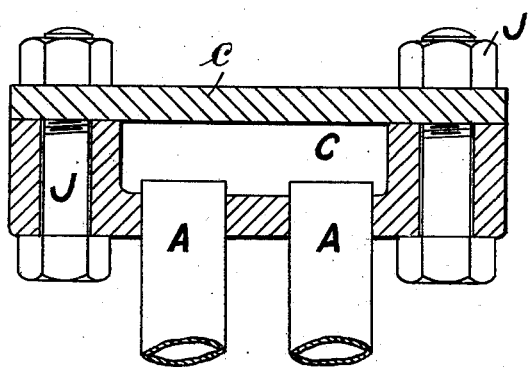

Fig. 9: The pipes A are passed through holes or sockets in the boxes or chambers C and riveted over or swelled or expanded at the extreme ends, so as to hold them in position. For this purpose the boxes or chambers C are made hollow and provided with movable lids $c$, which when the riveting or swelling has taken place are put on and fastened down by means of bolts and nuts J, thus making a tight joint. The boxes may be of any suitable shape.

Fig. 10: Into the ends of the pipes A are screwed the bushes K, each having a flange $g$. These flanges form abutments near the ends of the pipes, and one face is so shaped as to form seatings G at the bottom of the sockets in C. There are also sleeves F on the outside of the pipes adapted to screw into the sockets, and when these screwed sleeves F are tightly screwed up they press against the abutments $g$ aforesaid on the bushes K and hold the ends of the pipes firmly in position, so that there can be no possible leakage of steam.

Fig. 11: Bushes L are provided, which rest on the seats G at bottom of sockets in C. These bushes are made tapering on the outside and are arranged to receive, respectively, the pipes A, which are made with flaring or bell-mouthed ends to correspond with the taper bushes. On the outside of the pipe sleeves F are provided, which screw into the sockets. By screwing up these therefore the flaring or bell-mouth ends of the pipes A are forced home against the bushes and are gripped or held firmly in position between the sleeves F and the said bushes L.

Fig. 12: The pipes A are made flaring or bell-mouthed at the end, as in the last instance; but instead of seating themselves in a conical bush they seat themselves on seatings G at bottom of sockets in C. Sleeves F are provided, same as in last example, the screwing up of which against the flaring ends of the pipes A binds them firmly against the socket-seatings G.

Fig. 13: The sleeves F (described in connection with Figs. 7, 10, 11 and 12) are provided with lock-nuts M, which prevent any possible loosening of the sleeves F by vibration.

Fig. 14: The pipes A are screwed for a short distance at the ends, and then collars N are screwed on, forming annular abutments all around the ends of the pipes A. The ends of the pipes are then riveted over, so as to prevent any possibility of these collars coming off. The screwed sleeves F on the outside of the pipes are screwed into the sockets in C until they abut against the collar N, and the further screwing up of the screwed sleeves F forces the ends of the pipes home and tightens them against the seatings G at bottom of sockets.

Fig. 15: The pipes A are simply bolted at their ends to the boxes or chambers by means of flanges O through holes $o$.

Fig. 16: This figure shows an arrangement similar to that described in connection with Fig. 9, the only difference being that the boxes C are of a slightly different shape, so that the pipes A project at an angle.

In use the superheater, composed of the pipes A and boxes C, with the supply and delivery pipes, is arranged in a chamber or flue, the steam to be superheated is passed through the pipes A, and the hot gases of the furnace passing around and impinging against these pipes and the boxes to which they are secured or socketed superheat the steam and so prevent any liability of priming in the cylinder of the engine.

The invention as applied to feed-water heaters and the like will be understood without further description. It is obvious, however, that in such case the feed-water to be heated may be fed into a chamber or chambers, which are traversed by the pipes carrying the exhaust or live steam, so as to act upon the feed-water and heat it, or, if preferred, the reverse arrangement may be adopted—namely, heated gases and exhaust or live steam may be fed into the chamber and the feed-water to be heated passed through the pipes or be led direct through the pipes referred to above, in which case the feed-water instead of steam is passed through them to the boiler.

We declare that what we claim is—

1. A superheater or other analogous structure, comprising rows of pipes through which the steam and hot water are passed, said pipes having a serpentine or wavy outline, the said pipes being so arranged that their serpentine or wavy portions extend in planes at right angles to the serpentine or wavy portions of adjacent pipes, and means for connecting the ends of the said pipes, substantially as described.

2. A steam-superheater or other analogous structure, comprising pipes of a serpentine or wavy outline, the plane in which the waves of one pipe extend, being at right angles to the plane in which the waves of adjacent pipes extend, transverse boxes or chambers for connecting the ends of the pipes, said boxes having beveled faces for receiving the ends of alternate pipes, the said pipes extending alternately into sockets formed upon the opposite faces of the beveled boxes, and screwthreaded bushings for holding the ends of the pipes in position in said sockets, substantially as described.

3. In a steam-superheater or other analogous structure, the combination with a series of pipes of a serpentine or wavy contour, transverse boxes or chambers connecting the ends of said pipes and having sockets to receive the same, the said boxes being also provided with holes in their rear sides, and opposite to the pipes pins screwed into the ends of the pipes so as to hold them firmly in position with a certain amount of tension, means for securing the pins in position, said pins having holes which provide a through passage from the pipes to the inside of the boxes, substantially as described.

In witness whereof we have hereunto signed our names, this 15th, 19th, and 20th days of February, 1900, in the presence of two subscribing witnesses.

WILLIAM CAMERON BORROWMAN.
  JAMES B. EDMISTON.
  WILLIAM CARLILE WALLACE.

Witnesses to the signature of W. C. Borrowman:
  HERBERT WRIGHT BELL,
  WILLIAM FREELAND.

Witnesses to the signature of J. B. Edmiston:
  G. C. DYMOND,
  W. H. BEESTON.

Witnesses to the signature of W. C. Wallace:
  SARAH ONIONS,
  E. M. MOYLES.